(12) United States Patent
Kimura et al.

(10) Patent No.: US 7,594,871 B2
(45) Date of Patent: Sep. 29, 2009

(54) VARIABLE FLYWHEEL MECHANISM AND FLYWHEEL APPARATUS

(75) Inventors: Yasunari Kimura, Wako (JP); Takao Tsuboi, Wako (JP); Tsuneo Endoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 11/699,368

(22) Filed: Jan. 30, 2007

(65) Prior Publication Data

US 2007/0179012 A1    Aug. 2, 2007

(30) Foreign Application Priority Data

Jan. 31, 2006  (JP)  ............................ P2006-022301
Jan. 31, 2006  (JP)  ............................ P2006-022445

(51) Int. Cl.
*F16H 3/74*    (2006.01)

(52) U.S. Cl. ...................................................... 475/255

(58) Field of Classification Search ................ 74/574.2, 74/572.2, 433.5, 64; 475/331, 255, 267; 192/3.52
See application file for complete search history.

(56) References Cited

U.S. PATENT DOCUMENTS 1,785,338 A * 12/1930 Coleman ...................... 74/604
1,812,176 A *  6/1931 Sheridan ...................... 475/255
1,826,172 A * 10/1931 Greenwald .................. 475/149
1,858,696 A *  5/1932 Weiss ............................ 74/64
2,797,782 A *  7/1957 Connell ........................ 173/93
4,643,035 A *  2/1987 Murphy ......................... 74/64
5,322,149 A *  6/1994 Szadkowski ............. 192/70.17
6,044,718 A *  4/2000 Lester .......................... 74/112
6,062,096 A *  5/2000 Lester .......................... 74/112

FOREIGN PATENT DOCUMENTS

JP    56-173241 U    12/1981
JP    05-263874 A    10/1993
JP    2004-263766 A   9/2004

* cited by examiner

*Primary Examiner*—Roger L Pang
*Assistant Examiner*—Justin Holmes
(74) *Attorney, Agent, or Firm*—Birch, Stewart, Kolasch & Birch, LLP (57) ABSTRACT

A variable flywheel mechanism is capable of varying the moment of inertia is disclosed. The wheel mechanism includes a sun gear, planetary gears, pivotable arms swung by the planetary gears, and weights mounted on the pivotable arms. The positions of the weights are controlled by rotation of the sun gear.

7 Claims, 9 Drawing Sheets

VARIABLE FLYWHEEL MECHANISM AND FLYWHEEL APPARATUS

FIELD OF THE INVENTION

The present invention relates to a variable flywheel mechanism and a flywheel apparatus wherein the moment of inertia can be varied.

BACKGROUND OF THE INVENTION

The explosive power of an engine, for example, is generated in sequence in cylinders, but there may be irregularities in the force transmitted to the crankshaft used as the output shaft of the engine. The irregularities appear as torque fluctuations or fluctuations in the rotational speed of the crankshaft. It is known that if a heavy object known as a flywheel is attached to the crankshaft, these irregularities can be corrected with the moment of inertia of the heavy object.

Fluctuations in the rotational speed or torque (hereinafter referred to as fluctuations in rotational speed) of the crankshaft are particularly severe when the crankshaft is rotating at a low speed, such as is the case during idling (hereinafter referred to as low-speed rotation). Installing a flywheel apparatus therefore yields significant advantages.

On the other hand, when the crankshaft is rotating at high speeds, the advantages of installing a flywheel apparatus are small because fluctuations in the rotational speed and the like are small. The effects of correcting fluctuations are greater with greater moments of inertia in the heavy object, but at the same time, more rotational energy is consumed. Therefore, when the crankshaft is rotating at high speeds, the presence of a flywheel apparatus has an adverse effect on fuel efficiency and results in a slower response during acceleration.

In view of this, a need exists for a variable flywheel in which the moment of inertia is large during low-speed rotation and small during high-speed rotation. A variable flywheel is proposed in Japanese Utility Mode Laid-Open Publication No. 56-173241, Japanese Patent Laid-Open Publication No. 5-263874, and Japanese Patent Laid-Open Publication No. 2004-263766.

The variable flywheel disclosed in Japanese Patent Laid-Open Publication No. 2004-263766 will be described with reference to FIG. 8 hereof.

Figure 8:
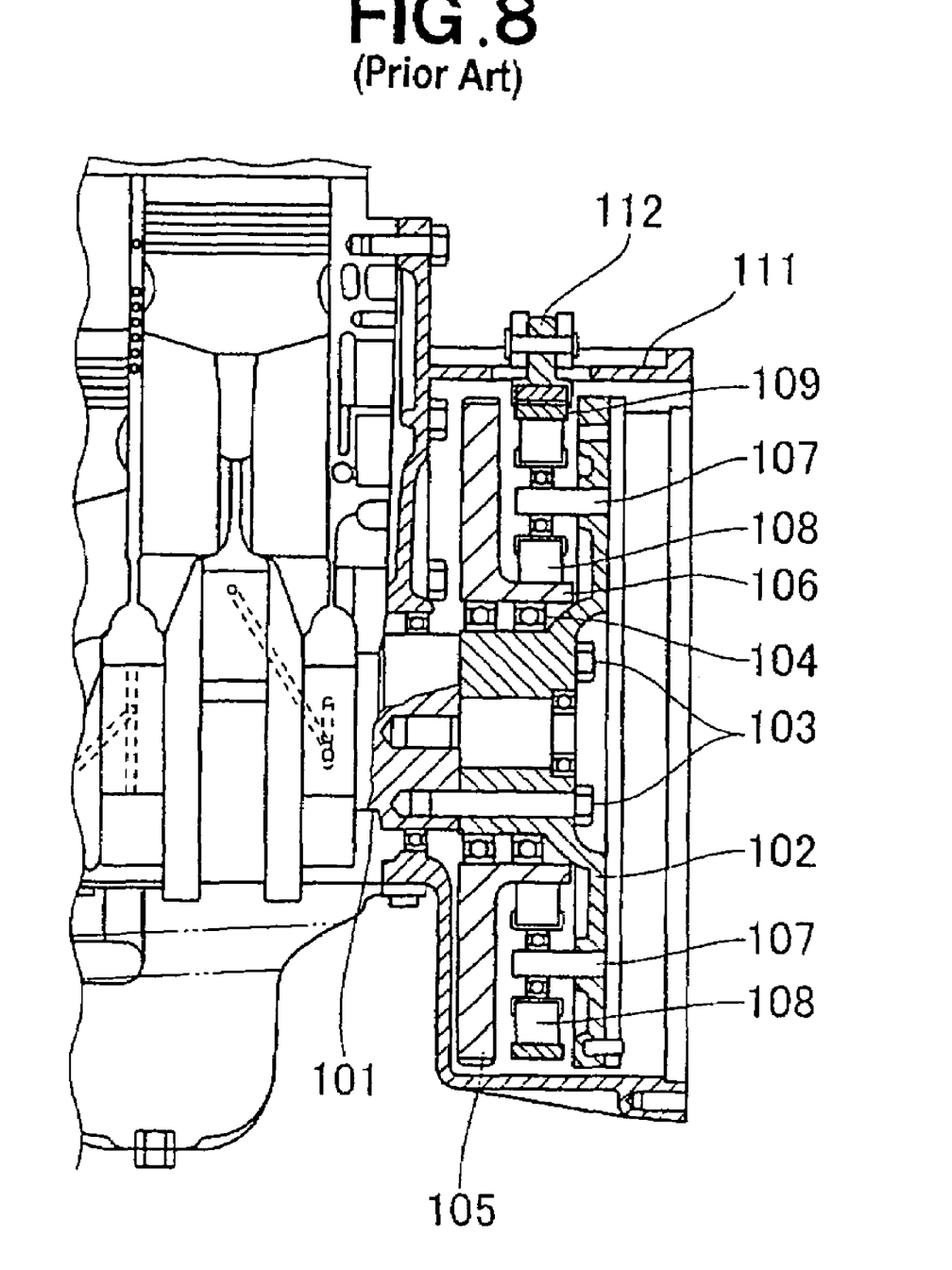
FIG. 8 is a side elevational view showing partly in section a conventional variable flywheel.

As shown in FIG. 8, a first flywheel 102 is fixed with bolts 103, 103 to one end of a crankshaft 101, a second flywheel 105 is mounted so as to be able to idle on the first flywheel 102 by means of a bearing 104, and a sun roller 106 is integrally formed on the second flywheel 105. Planet rollers 108, 108 are rotatably mounted on support shafts 107, 107 extending from the first flywheel 102. A flywheel having this configuration is known as a flywheel with a planetary mechanism, because the planet rollers 108, 108 revolve around the sun roller 106.

Furthermore, a ring member 109 encircles the planet rollers 108, 108. This ring member 109 can be braked with a brake mechanism 112 provided to a housing 111.

When the brake mechanism 112 is not braking, the ring member 109 idles, and the planetary mechanism therefore exhibits a decelerating effect from the first flywheel 102 towards the second flywheel 105. Therefore, the second flywheel 105 rotates at a low speed when the first flywheel 102 is rotating. As a result, the second flywheel 105 does not exhibit the effects of a flywheel. Specifically, only the first flywheel 102 exhibits the effects of a flywheel.

Fuel efficiency can be improved because the energy for rotating the second flywheel 105 is extremely small. This aspect can be used during high-speed rotation and other such times when rotation fluctuations are small.

When the brake mechanism 112 is braking, the ring member 109 is halted, and the planetary mechanism therefore exhibits an accelerating effect from the first flywheel 102 towards the second flywheel 105. Therefore, the second flywheel 105 rotates at a high speed when the first flywheel 102 is rotating. As a result, the second flywheel 105 exhibits a significant flywheel effect. Specifically, it is possible to achieve a significant flywheel effect with the first flywheel 102 and the second flywheel 105. This aspect can be used during idling and other such times when rotation fluctuations are large.

However, the flywheel with a planetary mechanism shown in FIG. 8 has the following problems.

First, one problem is that the moment of inertia has a narrow variability range. Generally, a greater variability range in the moment of inertia allows for greater variability control. It is advantageous to bring the mass (the flywheel mass, a weight) near the rotational center in order to bring down the lower limit of the moment of inertia. However, in the flywheel with a planetary mechanism shown in FIG. 8, the rotational center is in the crankshaft 101, and the mass therefore cannot be brought near the rotational center. Accordingly, the variability range of the moment of inertia is limited, and variability control is reduced.

Another problem is that two flywheels, namely, the first flywheel 102 and the second flywheel 105, are needed, and the entire weight of the variable flywheel increases, reducing the acceleration/deceleration characteristics (acceleration properties and deceleration properties) of the vehicle. The cost of the flywheel apparatus is also high, and fuel consumption increases.

Furthermore, only two aspects are possible with the application and release of braking with the brake mechanism 112. A larger selection of aspects must be available to more precisely correspond to a very low speed, low speed, medium speed, high speed, and very high speed, for example.

SUMMARY OF THE INVENTION

According to an aspect of the present invention, there is provided a variable flywheel mechanism having a rotational center and a plurality of weights and being capable of varying a distance from the rotational center to the weights, which mechanism comprises: a sun gear designed to be connected to an output shaft of an engine; a plurality of planetary gears for meshing with the sun gear; a plurality of carrier shafts for rotatably supporting the planetary gears; a plurality of pivotable arms swingably mounted on the carrier shafts and swung by the planetary gears; and a plurality of weight-accommodating parts located near the rotational center for accommodating the weights, the weights being mounted on the pivotable arms.

Since the apparatus includes weight-accommodating parts that can accommodate the weights near the rotational center, the pivotable arms can be pivoted to bring the weights near to the rotational center. As a result, the moment of inertia can be varied over a wider range.

Preferably, the carrier shafts are reinforced with a carrier-reinforcing member that extends radially from the rotational center and includes a plurality of ribs which are bent so as to form the weight-accommodating parts.

Since the carrier shafts are reinforced with the carrier-reinforcing member, there is no need for concern that the carrier shafts will deform or bend, and the power transmission capacity of the variable flywheel mechanism can be increased. In addition, the weights can be brought nearer to the rotational center because the weight-accommodating parts are formed on the carrier-reinforcing member.

According to another aspect of the present invention, there is provided a flywheel apparatus which comprises: a variable flywheel mechanism having a rotational center and a plurality of weights and being capable of varying a distance from the rotational center and the weights; and a switching clutch mechanism located between the variable flywheel mechanism and an output shaft of an engine so as to enable switching between two modes, namely, a mass control mode for varying the distance from the rotational center to the weights and a power transmission mode for transmitting the motive power of an engine to a load while the distance from the rotational center to the weights remains constant, wherein the variable flywheel mechanism comprises: a sun gear connected to the output shaft of the engine, a plurality of planetary gears that mesh with the sun gear; a plurality of carrier shafts for rotatably supporting the planetary gears; a carrier assembly for linking distal ends of the carrier shafts together; a flywheel output shaft extending from the carrier assembly; and a plurality of pivotable arms swingably mounted on the carrier shafts and swung by the planetary gears, the weights being mounted on the pivotable arms.

Part of the variable flywheel mechanism is configured from the pivotable arms and the weights. The pivotable arms and weights are smaller and lighter in weight in comparison with the conventional circular plate-shaped flywheel shown in FIG. 8. The two flywheels (first flywheel and second flywheel) shown in FIG. 8 are unnecessary. As a result, the flywheel apparatus can easily be made smaller and lighter in weight, and the capacity for acceleration and deceleration can be improved.

In addition, the pivotable arms can be swung to bring the weights closer to the rotational center. As a result, the moment of inertia can be varied over a wider range.

Desirably, the flywheel apparatus further comprise a control device for performing a series of control operations that include reading load information pertaining to the engine, switching from power transmission mode to mass control mode in accordance with the load information, changing the distance from the rotational center to the weights, and returning to power transmission mode.

The distance from the rotational center to the weights is changed in mass control mode. The distance from the rotational center to the weights can be changed continually by changing the angles of pivotal movement of the pivotable arms. As a result, a flywheel apparatus is provided that is capable of selecting numerous aspects pertaining to the moment of inertia.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
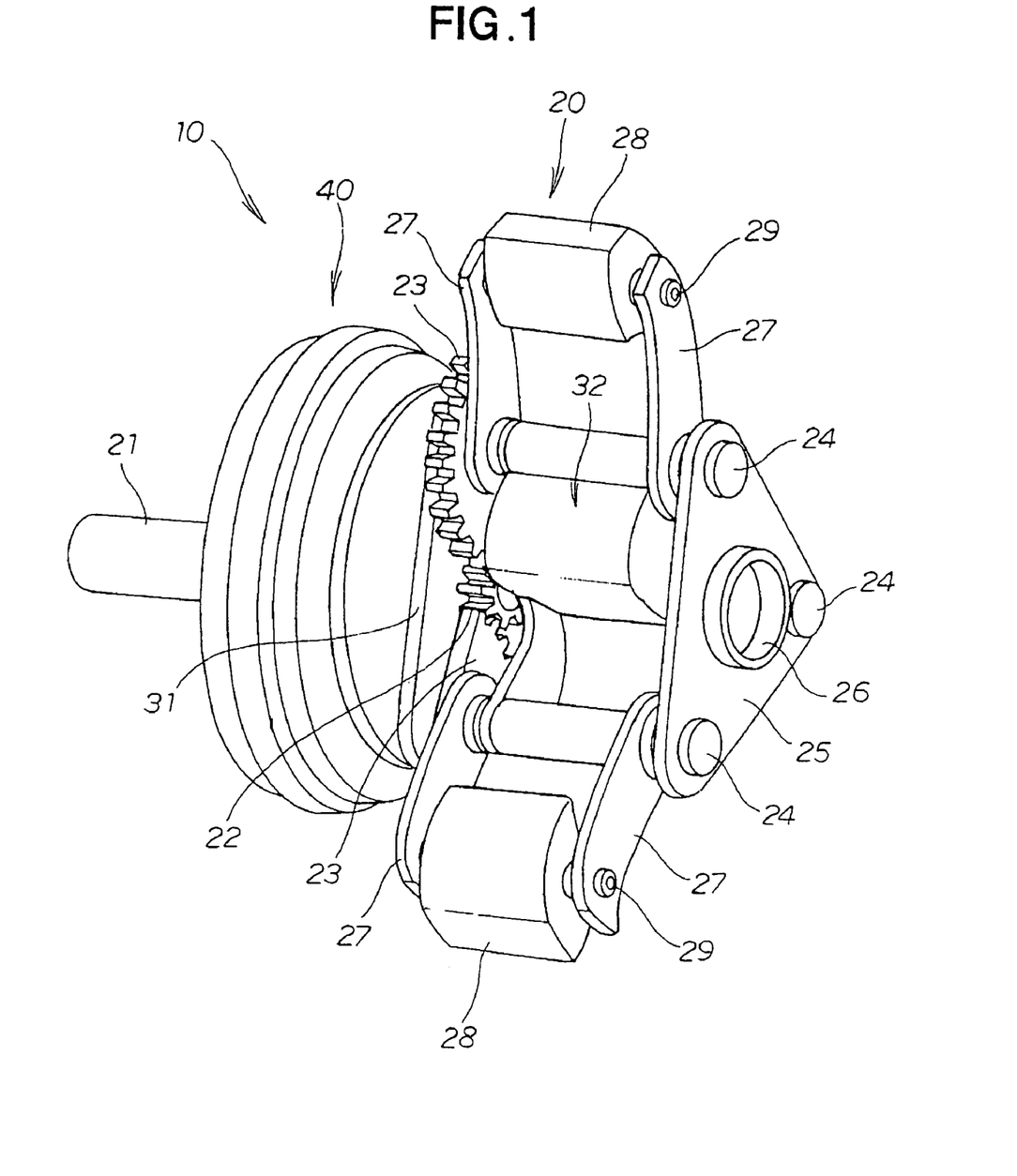
FIG. 1 is a perspective view of a flywheel apparatus according to the present invention.

A flywheel apparatus 10 shown in FIG. 1 is comprised of a variable flywheel mechanism 20 and a switching clutch mechanism 40.

Figure 2:
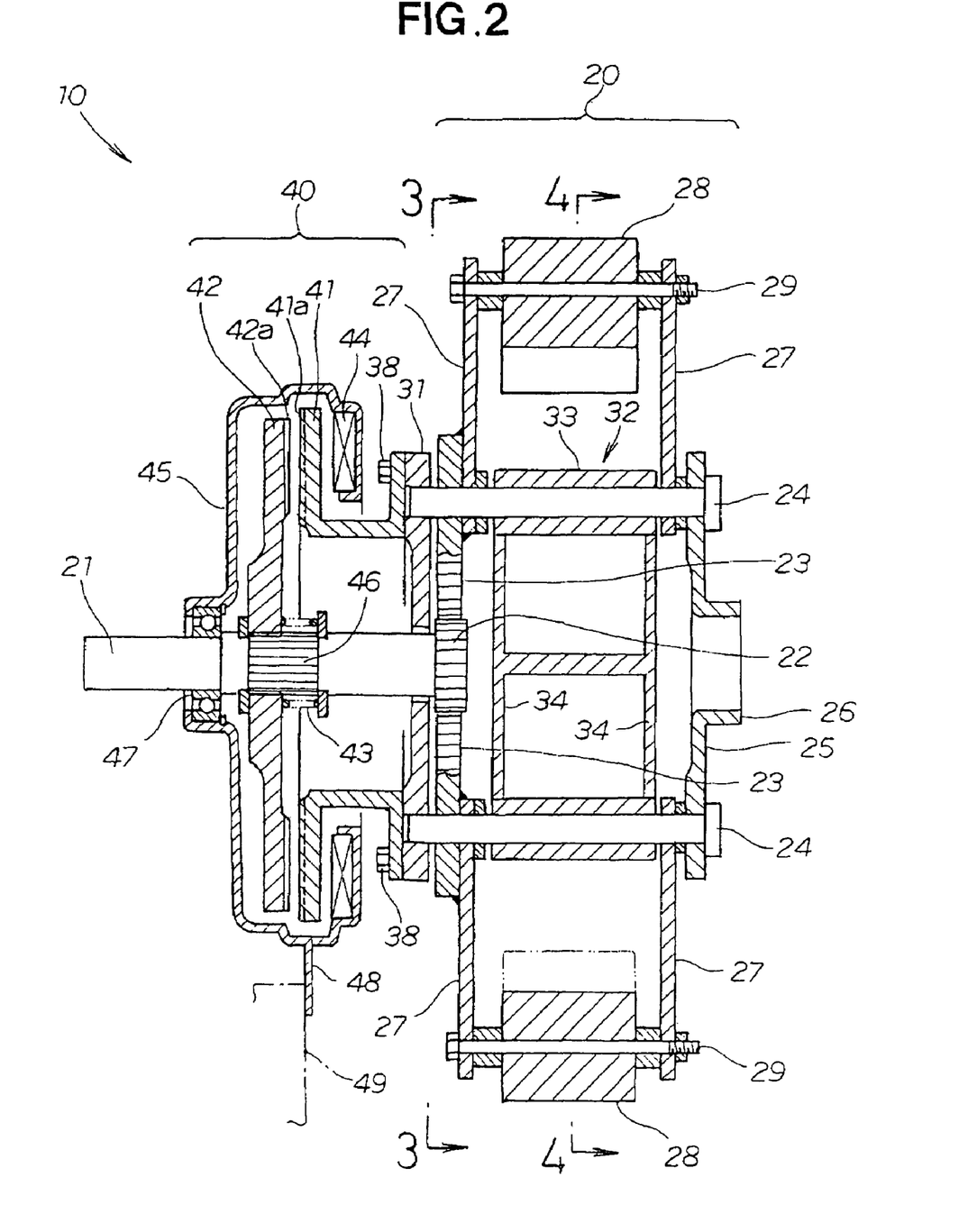
FIG. 2 is a cross-sectional view of the flywheel apparatus shown in FIG. 1.

The variable flywheel mechanism 20 shown in FIG. 2 has a sun gear 22 connected to an output shaft 21 of an engine, multiple planetary gears 23 that mesh with the sun gear 22, multiple carrier shafts 24 for rotatably supporting the planetary gears 23, a carrier assembly 25 for linking the distal ends of the carrier shafts 24 together, a flywheel output shaft 26 that extends from the carrier assembly 25, pivotable arms 27 that are swingably mounted on the carrier shafts 24 and that are swung by the planetary gears 23, and weights 28 that are mounted on these pivotable arms 27.

The weights 28 are integrally mounted on the pivotable arms 27, 27 by means of long bolts 29 spanning the distance between the left and right pivotable arms 27, 27. With this structure, the weights 28 can be replaced. If the weights 28 do not need to be replaced, the weights 28 may be fixed to the pivotable arms 27 by welding. Specifically, the planetary gears 23, the pivotable arms 27, and the weights 28 are all integrated and are incapable of moving relative to each other.

The carrier shafts 24 are non-rotating shafts that extend from the carrier assembly 25, and a shaft end support plate 31 supports the other ends of the carrier shafts.

It is believed that when the shaft end support plate 31 is rotated to turn the carrier assembly 25, the carrier shafts 24 deform or bend. In view of this, a carrier-reinforcing member 32 is placed between the carrier shafts 24. This carrier-reinforcing member 32 eliminates the possibility of the carrier shafts 24 deforming or bending, and allows a large torque to be transmitted from the shaft end support plate 31 to the carrier shafts 24.

The switching clutch mechanism 40 is linked to the shaft end support plate 31 with bolts 38. To present a structural example of the switching clutch mechanism 40, the switching clutch mechanism 40 is composed of a stationary clutch plate 41 fixed to the shaft end support plate 31 with bolts 38, a movable clutch plate 42 disposed to face the stationary clutch plate 41, an extrusion spring 43 for urging the movable clutch plate 42 to open the clutch, an electromagnetic coil 44 for moving the movable clutch plate 42 to turn the clutch on, and a clutch cover 45 that supports the electromagnetic coil 44 and encloses the movable clutch plate 42 and other components.

The movable clutch plate 42 is capable of moving in the on-off direction of the clutch along a spline 46 provided to the output shaft 21 of the engine, and the spring 43 causes the movable clutch plate 42 to separate from the stationary clutch plate 41 as shown in the drawing when electricity is not supplied to the electromagnetic coil 44. This state is also referred to as the clutch being off or open.

When electricity is supplied to the electromagnetic coil 44, the movable clutch plate 42 moves toward the stationary clutch plate 41 against the pressure of the spring 43, and a friction surface 42a of the movable clutch plate 42 comes into close contact with a friction surface 41a of the stationary clutch plate 41. This state is referred to as the clutch being on.

The numerical symbol 47 denotes a bearing, and the numerical symbol 48 denotes a rotation stopper, and this rotation stopper 48 is linked to a proper fixed part 49. The bearing 47 allows the output shaft 21 and the clutch cover 45 to rotate relative to each other. The clutch cover 45 is prevented from rotating (idling) by the rotation stopper 48 and the fixed part 49.

The switching clutch mechanism 40 described above is an electromagnetic clutch that uses electromagnetism, but may also be a hydraulic clutch that uses hydraulic pressure or a pneumatic clutch that uses air pressure. The configuration and type can be arbitrarily altered.

The three carrier shafts 24 extend between the triangular carrier assembly 25 and the shaft end support plate 31, and the carrier-reinforcing member 32 extends between the carrier shafts 24, as shown in FIG. 1. The pivotable arms 27 and the weights 28 are mounted on the three carrier shafts 24.

Part of the variable flywheel mechanism 20 is configured from the pivotable arms 27 and the weights 28. The pivotable arms 27 and the weights 28 axe smaller and lighter in weight in comparison with the circular plate-shaped flywheel shown in FIG. 8.

The following is a supplementary description, made with reference to separate drawings, of part of the variable flywheel mechanism 20.

Figure 3:
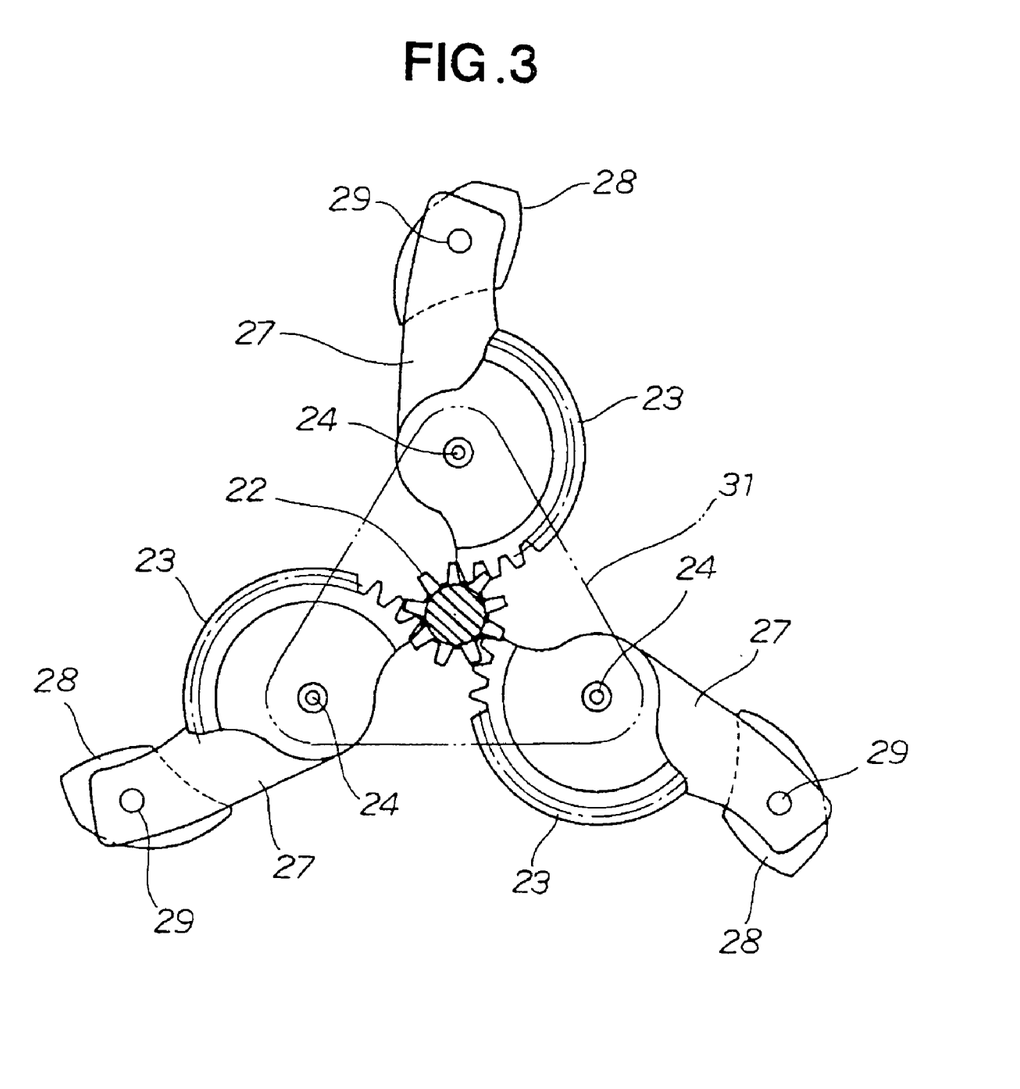
FIG. 3 is a cross-sectional view taken along line 3-3 of FIG. 2.

When the sun gear 22 rotates counterclockwise, the planetary gears 23 and the pivotable arms 27 revolve clockwise as shown in FIG. 3. The planetary gears 23 meshed with the sun gear 22 are arranged in a fan pattern. The planetary gears 23 may also be true-circle gears. Fan-shaped gears can be made much lighter in weight than true-circle gears.

Figure 4:
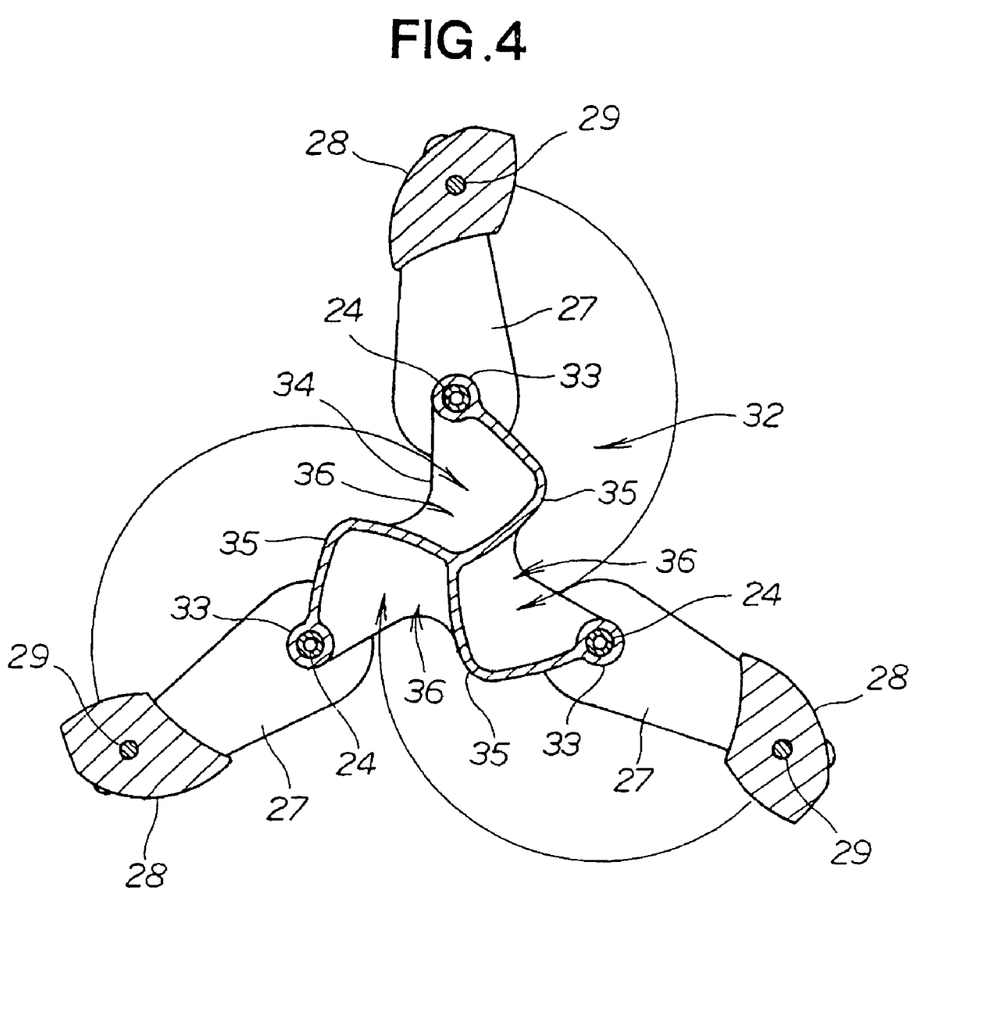
FIG. 4 is a cross-sectional view taken along line 4-4 of FIG. 2.

The carrier-reinforcing member 32 is composed of collars 33 for each of the carrier shafts 24, front and back wall members 34 that connect these collars 33, and ribs 35 that are V-shaped in cross-section and that extend between the collars 33 and wall members 34, as shown in FIG. 4. In addition, the ribs 35 are bent so as to form weight-accommodating parts 36. As a result, the weights 28 are able to enter into the weight-accommodating parts 36, as shown by the arrows.

The three carrier shafts 24 are power transmission members, and they must be prevented from deforming or bending when transmitting power. Since the triangular carrier-reinforcing member 32 reinforces the carrier shafts 24, the carrier shafts 24 can be prevented from deforming or bending, and a sufficiently large amount of torque can be transmitted.

The following is a description of the operation of the variable flywheel mechanism 20 having the configuration described above.

Figure 5A:
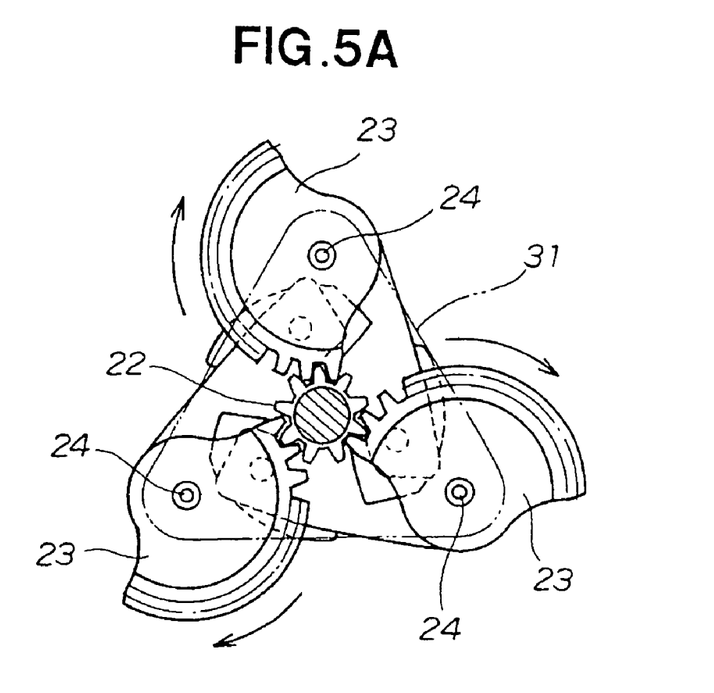
FIG. 5A is a schematic view illustrating an operation of the part shown in FIG. 3.

The rotation of the sun gear 22 causes the planetary gears 23 to collectively rotate clockwise, as shown in FIG. 5A, which is a diagram for describing the operation in FIG. 3.

Figure 5B:
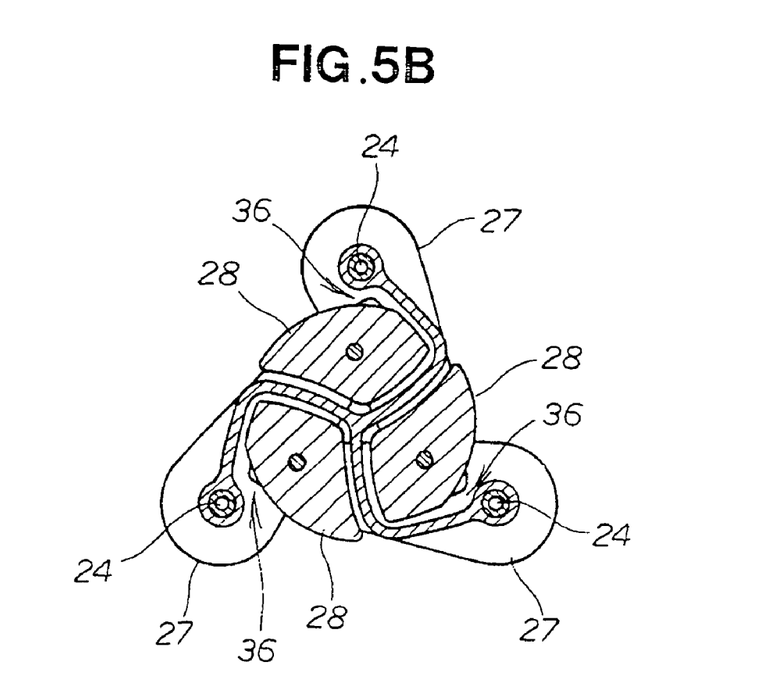
FIG. 5B is a schematic view illustrating an operation of the part shown in FIG. 4.

The weights 28 are accommodated in the weight-accommodating parts 36, as shown in FIG. 5B, which is a diagram for describing the operation in FIG. 4.

Specifically, FIG. 5A depicts a state in which the distance from the rotational center to the weights 28 is sufficiently increased to achieve a maximum flywheel effect. FIG. 5B depicts a state in which the distance from the rotational center to the weights 28 is sufficiently reduced, the moment of inertia is minimal, and the loss in rotational energy is minimal.

The sun gear 22 can be considered to be a drive member for rotating the planetary gears 23 by about 180°, as is made clear from FIG. 5A. Specifically, the planetary gear mechanism composed of the sun gear 22 and planetary gears 23 generally exhibits both decelerating and accelerating action, but also serves as a mechanism for varying the positions of the weights 28 in the present invention.

The following is a description of the overall operation of the flywheel apparatus 10 of the present invention.

Figure 6A:
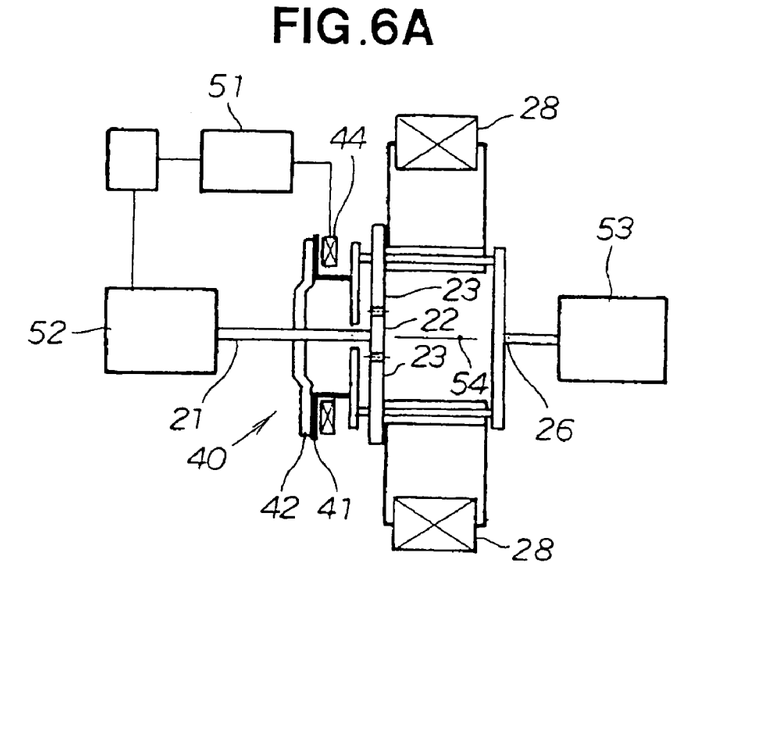
FIGS. 6A through 6D are schematic views illustrating an operation of the flywheel apparatus of the present invention.

As shown in FIG. 6A, the switching clutch mechanism 40 is in the clutch-on position, and the weights 28 are sufficiently separated from a rotational center 54, resulting in a "low-speed rotation power transmission mode." Since the clutch is on in this mode, the sun gear 22 and the planetary gears 23 are inhibited from rotating relative to each other, the output of an engine 52 is transmitted to the flywheel output shaft 26, and a transmission 53 is driven as a load. This mode is preferable during idling, transmission, and traveling at low speeds.

When rotation goes from low speeds to high speeds, a control device 51 changes the switching clutch mechanism 40 to the clutch-off position. This state is described in FIG. 6B.

Figure 6B:
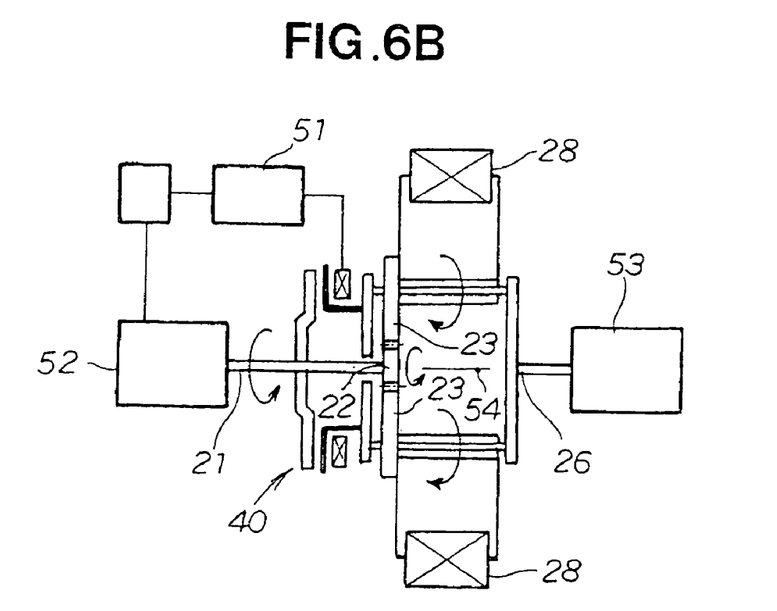
Figure 6C:
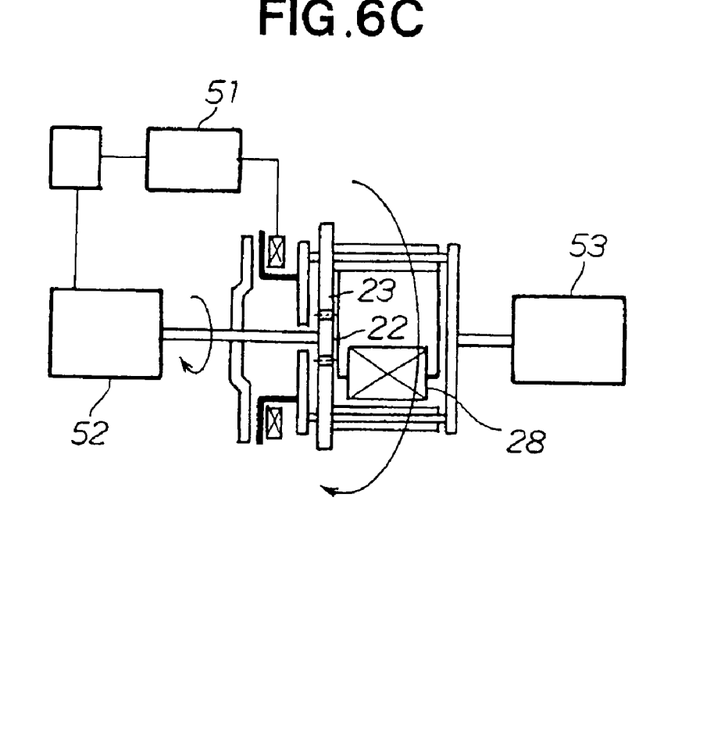

When the engine 52 is accelerating, the sun gear 22 begins to rotate relative to the planetary gears 23, as shown in FIG. 6B. Specifically, the rotational speed of the sun gear 22 is higher than the rotational speed of the planetary gears 23 during acceleration, and therefore a difference in speed arises by which the planetary gears 23 are rotated. As a result, the weights 28 move nearer to the rotational center 54 as shown in FIG. 6C. FIGS. 6B and 6C are equivalent to a "mass control mode."

Figure 6D:
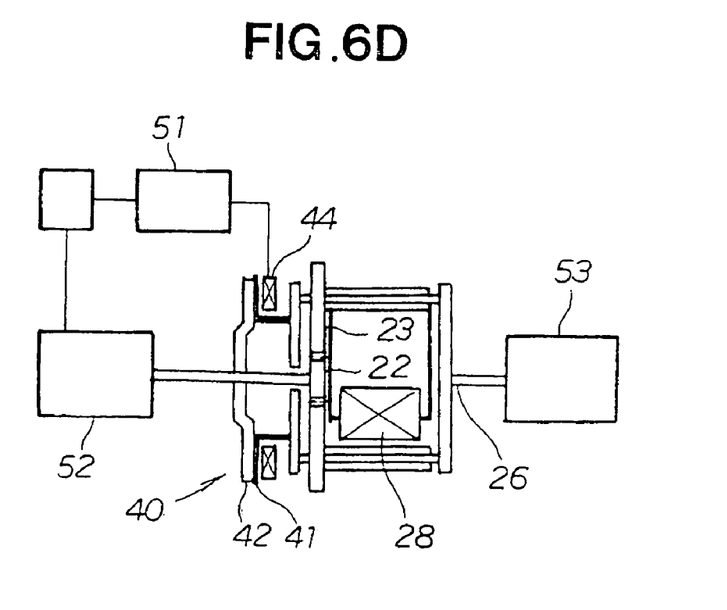

In FIG. 6D, the control device 51 changes the switching clutch mechanism 40 to the clutch-on position. This state is equivalent to a "high-speed rotation power transmission mode" in which the weights 28 are sufficiently close to the rotational center. Since the clutch is on in this mode, the sun gear 22 and planetary gears 23 are inhibited from rotating relative to each other, the output of the engine 52 is transmitted to the flywheel output shaft 26, and the transmission 53 is driven as a load. This mode is preferred during high-speed traveling.

When rotation goes from high speed to low speed, the apparatus is controlled in the sequence FIG. 6D→FIG. 6C→FIG. 6B→FIG. 6A. At this time, in FIG. 6C, engine braking causes the rotational speed of the sun gear 22 to be lower than the rotational speed of the planetary gears 23. This causes a relative speed difference and results in a transition from FIG. 6C to FIG. 6B.

The operation of the control device 51, which was described in a simple manner above, will now be described in detail.

In FIG. 6B, the control device 51 acquires load information (idling, acceleration, constant speed, deceleration, and other such information) pertaining to the engine 52, and selects a power transmission mode shown in FIG. 6A or 6D when the output of the engine 52 is equal to or less than a specific load value. This power transmission mode is a general term describing a state in which the switching clutch mechanism 40 is in the clutch-on position, regardless of the positions of the weights.

The control device 51 also temporarily changes the switching clutch mechanism 40 to the clutch-off position for a specific amount of time when the output of the engine 52 is equal to or less than a specific load value and/or equal to or greater than a load value. This state is equivalent to the mass control mode, and the positions of the weights 28 are changed in this mass control mode by a transition from FIG. 6B to 6C, or a transition from FIG. 6C to 6B. The amount of time required for this change is equivalent to the aforementioned specific amount of time. When the specific amount of time has elapsed, the switching clutch mechanism 40 is returned to the clutch-on position, and power transmission mode goes into effect.

Specifically, the flywheel apparatus 10 has a control device 51 for performing a series of control operations that include reading load information pertaining to the engine 52, switching from power transmission mode to mass control mode in accordance with this load information, changing the distance from the rotational center to the weights, and returning to power transmission mode.

FIG. 6A shows a state in which the weights 28 are sufficiently separated from the rotational center 54, and FIG. 6D shows a state in which the weights 28 are as close as possible to the rotational center. However, it is apparent that the weights 28 can be placed at arbitrary positions either by adjusting the length of the specific amount of time or by adjusting the rotational speed of the sun gear 22.

Therefore, the distance from the rotational center 54 to the weights 28 can be continually changed by changing the angles of swing or pivotal movement of the pivotable arms 27. As a result, the positions of the weights 28 can be changed with greater precision, and various flywheel effects can be achieved during very-low-speed rotation, low-speed rotation, medium-speed rotation, high-speed rotation, and very-high-speed rotation.

Figure 7A:
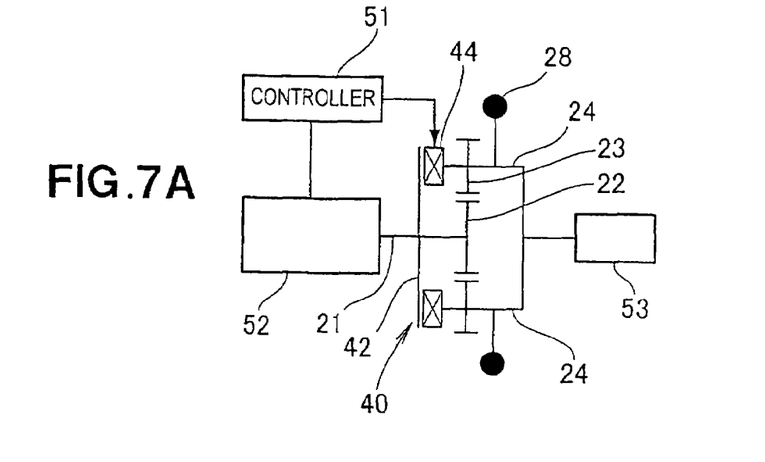
FIG. 7A is a diagrammatical view illustrating in simplified manner the principle of the flywheel apparatus shown in FIG. 6A.

Next, a modification according to the present invention will be described with reference to FIGS. 7B and 7C. Specifically, the switching clutch mechanism 40 is disposed between the output shaft 21 of the engine and the carrier shafts 24 of the variable flywheel mechanism 20, as shown in FIG. 7A (FIG. 6A with omissions). The modification will now be described using this as a basis.

Figure 7B:
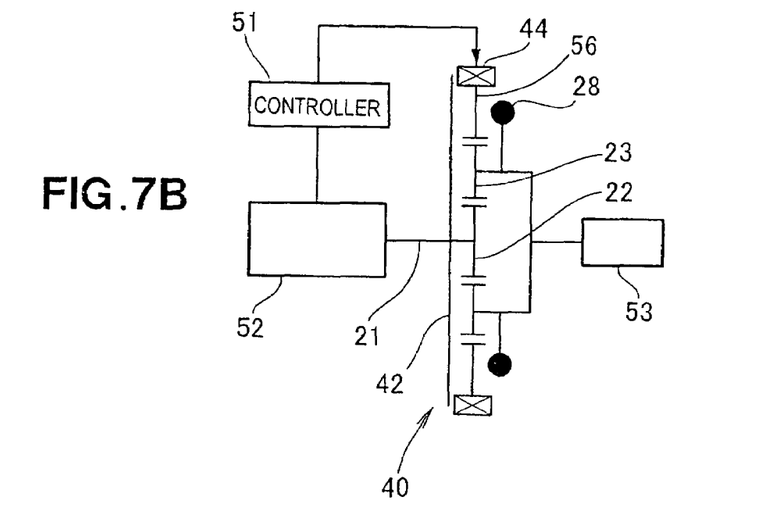
FIG. 7B is a diagrammatical view illustrating the principle of a modification of the arrangement shown in FIG. 7A.

The switching clutch mechanism 40 is disposed between the output shaft 21 of the engine and a ring gear 56, as shown in FIG. 7B. In this modification, power transmission mode goes into effect when the movable clutch plate 42 is connected to the ring gear 56 by means of the attractive force of the electromagnetic coil 44. When the movable clutch plate 42 is separated from the ring gear 56, mass control mode goes into effect, the sun gear 22 rotates the planetary gears 23, and the weights 28 change positions.

Figure 7C:
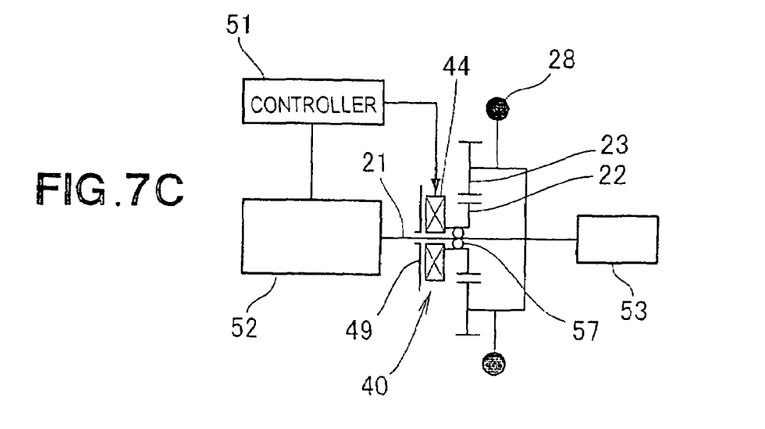
FIG. 7C is a diagrammatical view illustrating the principle of a separate modification of the arrangement shown in FIG. 7A.

As shown in FIG. 7C, the output shaft 21 is directly connected to the transmission 53, the sun gear 22 is mounted so as to be able to idle on the output shaft 21 via a bearing 57, and the sun gear 22 is linked to the fixed part 49 via the switching clutch mechanism 40. FIG. 7C shows the clutch-off state, and the planetary gears 23 therefore rotate around the output shaft 21 in conjunction with the sun gear 22. The motive power can be transmitted from the engine 52 to the transmission 53 while the distance from the rotational center to the weights 28 is constant. Specifically, the power transmission mode can be activated while the clutch is off.

Next, when electricity is supplied to the electromagnetic coil 44 by the control device 51, the sun gear 22 is linked to the fixed part 49, and the sun gear 22 is brought to a stop and made incapable of idling. The weights 28 can change positions because the freely rotating planetary gears 23 surround the secured sun gear 22. Specifically, mass control mode can be activated while the clutch is on.

When the weights 28 have changed positions, the clutch can be turned off to return to power transmission mode.

Thus, the sun gear 22, the planetary gears 23, or the ring gear 56 is restrained by the switching clutch mechanism 40, the mode can be switched from power transmission mode to mass control mode and vice versa. Therefore, the combination of the variable flywheel mechanism 20 and the switching clutch mechanism 40 may be suitably altered.

The flywheel apparatus of the present invention can be used in a vehicle flywheel located between an engine and a transmission, but the load is not limited to a transmission.

Also, three planetary gears were used in this embodiment, but this number is not limited as long there is an equal number of planetary gears and weights.

Obviously, various minor changes and modifications of the present invention are possible in light of the above teaching. It is therefore to be understood that within the scope of the appended claims the invention may be practiced otherwise than as specifically described.

What is claimed is:

1. A variable flywheel mechanism having a rotational center and a plurality of weights and being capable of varying a distance from the rotational center to the weights, the mechanism comprising:
    a sun gear designed to be connected to an output shaft of an engine;
    a plurality of planetary gears for meshing with the sun gear;
    a plurality of carrier shafts for rotatably supporting the planetary gears;
    a plurality of pivotable arms swingably mounted on the carrier shafts and swung by the planetary gears; and
    a plurality of weight-accommodating parts located near the rotational center for accommodating the weights, each of the weights being adapted to enter into a corresponding one of the weight-accommodating parts so that the each weight is surrounded on three or more sides by walls of the corresponding weight-accommodating part, the weights being mounted on the pivotable arms.

2. A variable flywheel mechanism having a rotational center and a plurality of weights and being capable of varying a distance from the rotational center to the weights, the mechanism comprising:
    a sun gear designed to be connected to an output shaft of an engine;
    a plurality of planetary gears for meshing with the sun gear;
    a plurality of carrier shafts for rotatably supporting the planetary gears;
    plurality of pivotable arms swingably mounted on the carrier shafts and swung by the planetary gears; and
    a plurality of weight-accommodating parts located near the rotational center for accommodating the weights,
    the weights being mounted on the pivotable arms,
    wherein the carrier shafts are reinforced with a carrier-reinforcing member extending radially from the rotational center and including a plurality of ribs, the ribs being bent so as to form the weight-accommodating parts.

3. A flywheel apparatus comprising:
    a variable flywheel mechanism having a rotational center and a plurality of weights and being capable of varying a distance from the rotational center to the weights; and
    a switching clutch mechanism located between the variable flywheel mechanism and an output shaft of an engine so as to enable switching between a mass control mode for varying the distance from the rotational center to the weights and a power transmission mode for transmitting motive power of the engine to a load while the distance from the rotational center to the weights remains constant, wherein the variable flywheel mechanism comprises:
a sun gear connected to the output shaft of the engine;
a plurality of planetary gears for meshing with the sun gear;
a plurality of carrier shafts for rotatably supporting the planetary gears;
a carrier assembly for linking distal ends of the carrier shafts together;
a flywheel output shaft extending from the carrier assembly; and
a plurality of pivotable arms swingably mounted on the carrier shafts and swung by the planetary gears, the weights being mounted on the pivotable arms,
further comprising a control device for performing a series of control operations that include reading load information pertaining to the engine, switching from a power transmission mode to a mass control mode in accordance with the load information, changing the distance from the rotational center to the weights, and returning to the power transmission mode.

4. The variable flywheel mechanism of claim 1, further comprising a control device for performing a series of control operations that include reading load information pertaining to the engine, switching from a power transmission mode to a mass control mode in accordance with the load information, changing the distance from the rotational center to the weights, and returning to the power transmission mode.

5. The variable flywheel mechanism of claim 1, further comprising a triangular-shaped shaft end support plate for support one end of each of the carrier shafts.

6. The variable flywheel mechanism of claim 2, further comprising a triangular-shaped shaft end support plate for support one end of each of the carrier shafts.

7. The flywheel apparatus of claim 3, further comprising a triangular-shaped shaft end support plate which is adapted to rotate the carrier assembly.

* * * * *